H. H. HEROLD AND T. F. WILLIAMS.
AUTOMOBILE RADIATOR.
APPLICATION FILED JAN. 29, 1919.
1,360,949.
Patented Nov. 30, 1920.
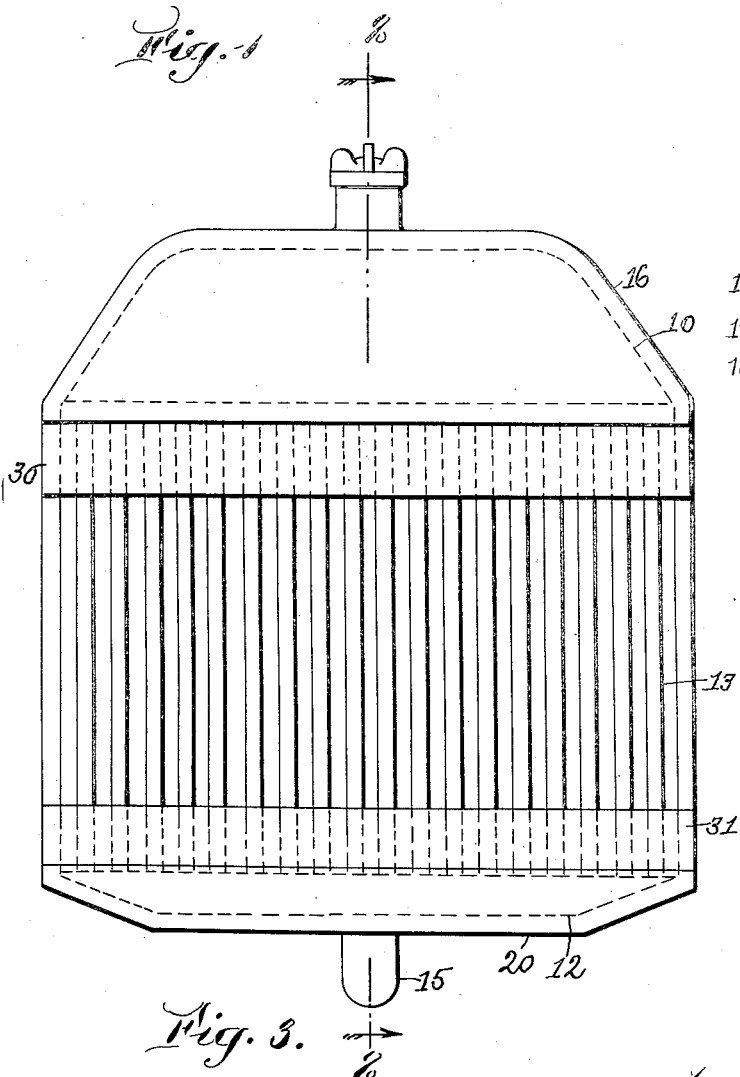
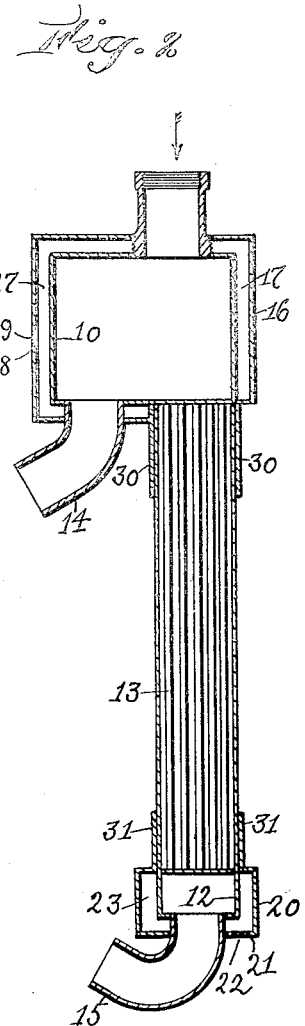
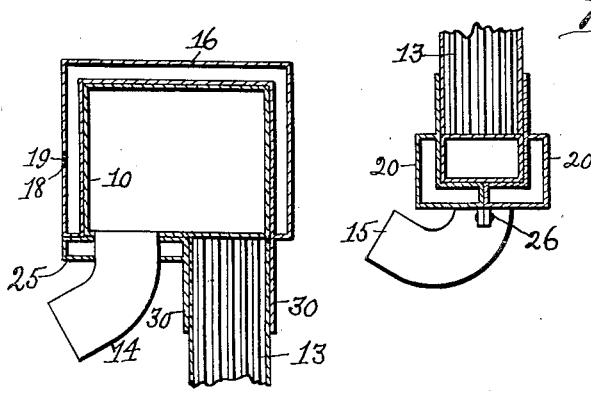
Inventors.
Harry H. Herold
Thomas F. Williams
by Jas. H. Churchill
Atty.

UNITED STATES PATENT OFFICE.

HARRY H. HEROLD, OF FORT WORTH, TEXAS, AND THOMAS F. WILLIAMS, OF QUINCY, MASSACHUSETTS; SAID HEROLD ASSIGNOR TO SAID WILLIAMS.

AUTOMOBILE-RADIATOR.

1,360,949.   Specification of Letters Patent.   Patented Nov. 30, 1920.

Application filed January 29, 1919. Serial No. 273,843.

*To all whom it may concern:*

Be it known that we, HARRY H. HEROLD and THOMAS F. WILLIAMS, citizens of the United States, and residents of Fort Worth and Quincy, counties of Tarrant and Norfolk, and States of Texas and Massachusetts, respectively, have invented an Improvement in Automobile-Radiators, of which the following description, in connection with the accompanying drawings, is a specification, like characters on the drawings representing like parts.

This invention relates to radiators of the character commonly used in automobiles and like motor vehicles and comprising upper and lower water-containing chambers and intermediate tubes or ducts connecting said chambers, and has for its object to provide the water-containing chambers with external hollow protective members, whereby the liability of the water in said water-containing chambers freezing at low temperatures is avoided or at least reduced to a minimum.

The external hollow protective members for the best results will cover substantially all of the water-containing chambers, and may and preferably will have the air exhausted therefrom to form vacuum chambers, which offer a most effective protection against freezing for the water-containing chambers.

The hollow protective members may and preferably will have coöperating with them plates to serve as shields for the tubes or ducts connecting the water-containing chambers.

These and other features of this invention will be pointed out in the claims at the end of this specification.

Figure 1 is a front elevation of one form of an automobile radiator embodying the invention.

Fig. 2, a vertical section on the lines 2—2, Fig. 1, and

Figs. 3 and 4, details in section of modifications to be referred to.

The radiator herein shown is substantially that employed on the well-known Ford automobile and consists of an upper water-containing chamber 10, a lower or bottom water-containing chamber 12, and intermediate vertically arranged tubes or ducts 13 connecting said chambers. The upper chamber 10 is provided with an inlet pipe 14 and the lower chamber 12 with an outlet pipe 15, which are connected in the usual manner with the water jacket of the engine or motor of the automobile not shown.

In accordance with this invention, the water-containing chambers 10, 12, are provided with hollow protective members, which may and preferably will be made as herein shown.

The hollow protective member for the upper chamber 10 is made as a jacket 16, preferably of sheet metal, which for the best results covers all sides or surfaces of the chamber 10 so as to surround the water-containing chamber 10 with a space 17, which may contain air, or, as is preferred, may contain a vacuum formed by exhausting the air therefrom through an air outlet 18, which is hermetically sealed by solder 19 or otherwise after the air has been exhausted from the space through the outlet 18 by means of a suction pump, not shown, in a manner well understood.

The lower water-containing chamber 12 is provided with a similar jacket 20, which is provided with an air outlet 21, through which the air is exhausted and which is hermetically sealed by solder 22 or otherwise after the vacuum has been produced in the space 23. The jacket 20 as shown covers two sides and the bottom of the water chamber 12, leaving the upper surface uncovered, and the jacket 16 for the upper chamber 10 covers the top, the two sides and a portion of the bottom of the chamber 10.

The vacuum chambers or spaces 17, 23, cover the greater portion of the water-containing chambers 10, 12, and form a most effective protector against freezing when the water in the radiator is not in motion, as, for instance, when the car is standing still and the engine is not running.

The vacuum containing jackets form an insulator of maximum efficiency against the cold, and while it is preferred to form a vacuum in the jackets, it is not desired to limit the invention in this respect as an effective insulation is obtained with the jackets filled with air.

The tubes or ducts 13 may also be protected on their front and rear surfaces, and this may be accomplished as shown, by means of plates 30 attached to the upper jacket 16 and by plates 31 attached to the lower jacket 20. These plates are herein shown as plain plates which extend but partially the length of the tubes 13, but it is evident that they may be made of any desired length so as to cover the whole or any part of the length of said tubes.

The cover plates 30, 31, for the tubes may be attached to the hollow jackets as shown or they may be separate therefrom.

In the construction illustrated in Figs. 1 and 2, the jackets 16 and 20 are represented as permanent parts of the radiator and are soldered or otherwise secured air-tight to the chambers 10, 12, whereas in Figs. 3 and 4, the jackets 16, 20, are made separate from the radiator and so as to be readily applied to and removed therefrom.

In Fig. 3, the jacket 16 is provided with an upper part having a double wall and capable of being slipped down over the chamber 10 of the radiator, and has a bottom part 25 provided with a double wall and separate from the upper part of the jacket.

The two parts may be detachably connected together in any suitable manner.

The jacket 20 is shown in Fig. 4 as made in two parts or halves provided with double walls and detachably secured together by screws 26 or otherwise.

The invention is shown as embodied in one form of water-containing radiator but it is not desired to limit the invention in this respect.

Claims:

1. The combination with a radiator for motor vehicles provided with an upper and a lower water-containing chamber and with a plurality of intermediate ducts connecting said chambers, of a hollow air tight jacket surrounding the upper chamber with an air space on its front and rear sides, its top and a portion of its bottom side, and a hollow air tight jacket surrounding the lower chamber with an air space on its front, rear and bottom sides.

2. The combination with a radiator provided with an upper and a lower water-containing chamber and with a plurality of intermediate ducts connecting said chambers, of hollow jackets covering said chambers, and means for covering a portion of the front and rear surfaces of said intermediate ducts.

In testimony whereof we have signed our names to this specification.

HARRY H. HEROLD.
THOMAS F. WILLIAMS.